United States Patent
Alajbegovic et al.

(10) Patent No.: US 10,240,518 B2
(45) Date of Patent: Mar. 26, 2019

(54) INTEGRATED VANE STOPS FOR VARIABLE-GEOMETRY TURBOCHARGER MECHANISM

(71) Applicant: BorgWarner Inc., Auburn Hills, MI (US)

(72) Inventors: Vahidin Alajbegovic, Arden, NC (US); Daniel J. Van Saun, Hendersonville, NC (US); Robert S. Lerosen, Chandler, NC (US); Daniel N. Ward, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 353 days.

(21) Appl. No.: 14/774,165

(22) PCT Filed: Mar. 12, 2014

(86) PCT No.: PCT/US2014/024351
§ 371 (c)(1),
(2) Date: Sep. 10, 2015

(87) PCT Pub. No.: WO2014/150830
PCT Pub. Date: Sep. 25, 2014

(65) Prior Publication Data
US 2016/0084154 A1 Mar. 24, 2016

Related U.S. Application Data

(60) Provisional application No. 61/786,724, filed on Mar. 15, 2013.

(51) Int. Cl.
F02B 37/24 (2006.01)
F01D 17/16 (2006.01)

(52) U.S. Cl.
CPC ............ *F02B 37/24* (2013.01); *F01D 17/165* (2013.01); *F05D 2220/40* (2013.01); *Y02T 10/144* (2013.01)

(58) Field of Classification Search
CPC .... F02B 37/24; F01D 17/165; F05D 2220/40; Y02T 10/144

(Continued)

(56) References Cited

U.S. PATENT DOCUMENTS

2002/0119041 A1* 8/2002 Jinnai .................. F01D 17/165
415/160
2006/0112690 A1* 6/2006 Hemer ................. F01D 17/165
60/602

(Continued)

FOREIGN PATENT DOCUMENTS

JP 11343857 12/1999

*Primary Examiner* — Laert Dounis
*Assistant Examiner* — Kelsey L Stanek
(74) *Attorney, Agent, or Firm* — Eric L. Doyle; Stephan A. Pendorf; Patent Central LLC

(57) ABSTRACT

A variable-geometry turbocharger (1) with a vane lever (11) that provides a stop function at full open position of the guide vanes (8). The integrated vane-open stop controls the full open position of the VTG mechanism. A vane lever (11) preferably has an integrated protrusion (50) that functions as a vane-open stop that contacts an adjacent vane lever (11), an integrated bolt (56), or the upper vane ring (16) at the full open position to regulate maximum exhaust gas flow to the turbine wheel (5).

11 Claims, 6 Drawing Sheets

(58) Field of Classification Search
USPC .................................................. 415/148, 165
See application file for complete search history.

(56) References Cited

U.S. PATENT DOCUMENTS

2009/0022581 A1    1/2009  Tries et al.
2012/0121392 A1*  5/2012  Azuma .................. F02B 37/24
                                                                           415/151

* cited by examiner

INTEGRATED VANE STOPS FOR VARIABLE-GEOMETRY TURBOCHARGER MECHANISM

CROSS-REFERENCE TO RELATED APPLICATION

This application claims priority to and all benefits of U.S. Provisional Application No. 61/786,724, filed on Mar. 15, 2013, and entitled "Integrated Vane Stops For Variable-Geometry Turbocharger Mechanism".

BACKGROUND

Field of the Disclosure

This disclosure relates to control components for turbochargers with Variable Turbine Geometry (VTG). More particularly, this disclosure relates to integrated vane-open stops that control the full open position of the VTG mechanism to regulate exhaust gas flow to the turbine.

Description of Related Art

Advantages of turbocharging include increased power output, lower fuel consumption and reduced pollutant emissions. The turbocharging of engines is no longer primarily seen from a high power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel/impeller that is mounted on the same shaft so that rotation of the turbine wheel causes rotation of the compressor wheel/impeller.

This disclosure focuses on a Variable Turbine Geometry (VTG) aspect of turbochargers. VTG turbochargers utilize adjustable guide vanes that are pivotally connected to a lower ring and an upper vane ring, including various possible rings, and/or nozzle wall. These guide vanes are adjusted to control exhaust gas backpressure and turbocharger speed by modulating the exhaust gas flow to the turbine wheel. The guide vanes are pivoted by vane levers. Performance and flow to the turbine are influenced by changes of the flow angle to the turbine wheel by pivoting the guide vanes.

One goal of VTG turbochargers is to expand the usable flow rate range in practical applications while maintaining a high level of efficiency. To accomplish this, the turbine output is regulated by changing an inflow angle and inflow speed of the exhaust gas flow at a turbine wheel inlet. With VTG turbochargers, this is achieved using guide vanes in front of the turbine wheel that change their angle of attack with exhaust gas flow speed. This reduces lag at slow speeds while opening to prevent exhaust gas backpressure at higher speeds.

With VTG, turbocharger ratios can be altered as conditions change. When the guide vanes are in a closed position, the high circumferential components of the flow speed and a steep enthalpy gradient lead to a high turbine output and therefore to a high charging pressure. When the guide vanes are in a fully open position, the turbine reaches its maximum flow rate and the velocity vector of the flow has a large centripetal component. The advantage of this type of output control over bypass control is that the entire exhaust gas flow is always directed through the turbine and can be converted to output. Adjustments of the guide vanes can be controlled by various pneumatic or electrical regulators.

An exemplary exhaust-gas turbocharger shown in prior art FIGS. 1-3 from U.S. Pat. No. 7,886,536 includes a turbine housing and a bearing housing, with a rotating shaft. On one end the shaft carries the compressor wheel/impeller and on the shaft's other end the turbine wheel. Within the turbine housing on the side of the turbine wheel a volute is formed which in radial direction evolves into a throat. Inside the throat adjustable guide vanes are located.

The guide vanes are pivoted from a vane bearing ring and from a thrust- and bearing ring which is by a spacer kept at a certain distance from the vane bearing ring, and they are adjustable through an actuator that actuates the unison ring. A rotary motion of the unison ring with respect to the vane bearing ring is transmitted onto the guide vanes, which can be adjusted within a pre-determined range between the open position and the closed position.

Typically, the closed position of the guide vanes is used to establish the position of the vanes in relation to the actuator. Current vane learn methodology is to "learn" against the vane closed position. While the closed position of the guide vanes is relatively fixed, the actuator position that relates to the closed position of the guides vanes varies due to extensive stackup of clearances and component tolerances between the guide vanes and other components, such as the actuator. Due to fixed limited travel of the actuator, the open vane position will vary dependent on the learned vane closed position. The learned vane closed position results in the open vane position of the guide vanes in turbochargers varying from one turbocharger to another.

U.S. Pat. No. 7,886,536 discloses an "Exhaust-gas Turbocharger, Regulating Device for an Exhaust-gas Turbocharger and Vane Lever for a Regulating Device". Vane levers with axial bosses have circularly curved contour segments that provide for rolling movement with the inner circumference of the unison ring. This allows the vane lever to roll against the unison ring, but does not stop against the unison ring at a full open position.

U.S. Pat. No. 8,328,520 discloses a VTG turbocharger with separately formed vane lever stops. The stop is embodied as a separate component that can be fixed in the guide grate for adjusting the minimum throughflow.

In certain applications, regulating the full open position can be key. Certain turbochargers require full flow capacity of the VTG that may have insufficient maximum flow capacity when the vanes do not fully open. It is desirable therefore to provide a method where the full vane open position is established by a fixed stop.

SUMMARY

The disclosure provides a means for controlling the full open position of the VTG mechanism by providing an integrated fixed stop. A vane-open stop for VTG turbocharger mechanisms can be integrated into control components, such as the vane lever, where the stop regulates exhaust gas to the turbine at maximum flow at the full vane-open position. Vane-open stops for the VTG mechanism will: 1) reduce the variation in the vane full open angle, 2) reduce the variation in the overall vane travel span, and 3) prevent contact between the vanes and turbine wheel, thereby minimizing clearance stackup and regulating throughflow in the vane-open positions. The integrated vane-open stop for a VTG turbocharger can take several forms.

The first embodiment modifies the vane lever with a coplanar protrusion to allow adjacent vane levers to stop against one another and possibly integrated bolts in the full open position. This should provide good control of the open position with minimized stackup.

A further embodiment provides integrated bolt locations with features that limit the travel of adjacent vane levers. The vane-stop collars at each bolt location can control adjacent vane levers, such as three vane levers interacting with three adjacent bolts.

Another embodiment modifies the vane lever with a transverse protrusion to allow the vane lever to contact the upper vane ring, including a unison ring. This should provide good control of the open position with minimized stackup.

Each design for vane-open stops is integrated and controls the full open position of the VTG mechanism to regulate maximum exhaust gas flow to the turbine via the adjustable guide vanes. With the "learn" against the vane open position as a new strategy, the actuator learn software will be modified to ensure consistent learn against the new vane-open stop. Also, bias linkage design can be altered so that open stop can be reached under all conditions, but an adjustment to the linkage up or down (more open or closed) is not the primary means to achieve full flow capacity when using integrated fixed vane-open stops.

BRIEF DESCRIPTION OF THE DRAWINGS

Advantages of the present disclosure will be readily appreciated as the same becomes better understood by reference to the following detailed description when considered in connection with the accompanying drawings wherein:

FIG. 7 shows an end view of portions of a VTG turbocharger with vane levers that stop by contacting the upper vane ring.

DETAILED DESCRIPTION OF THE EMBODIMENTS

Figure 1:
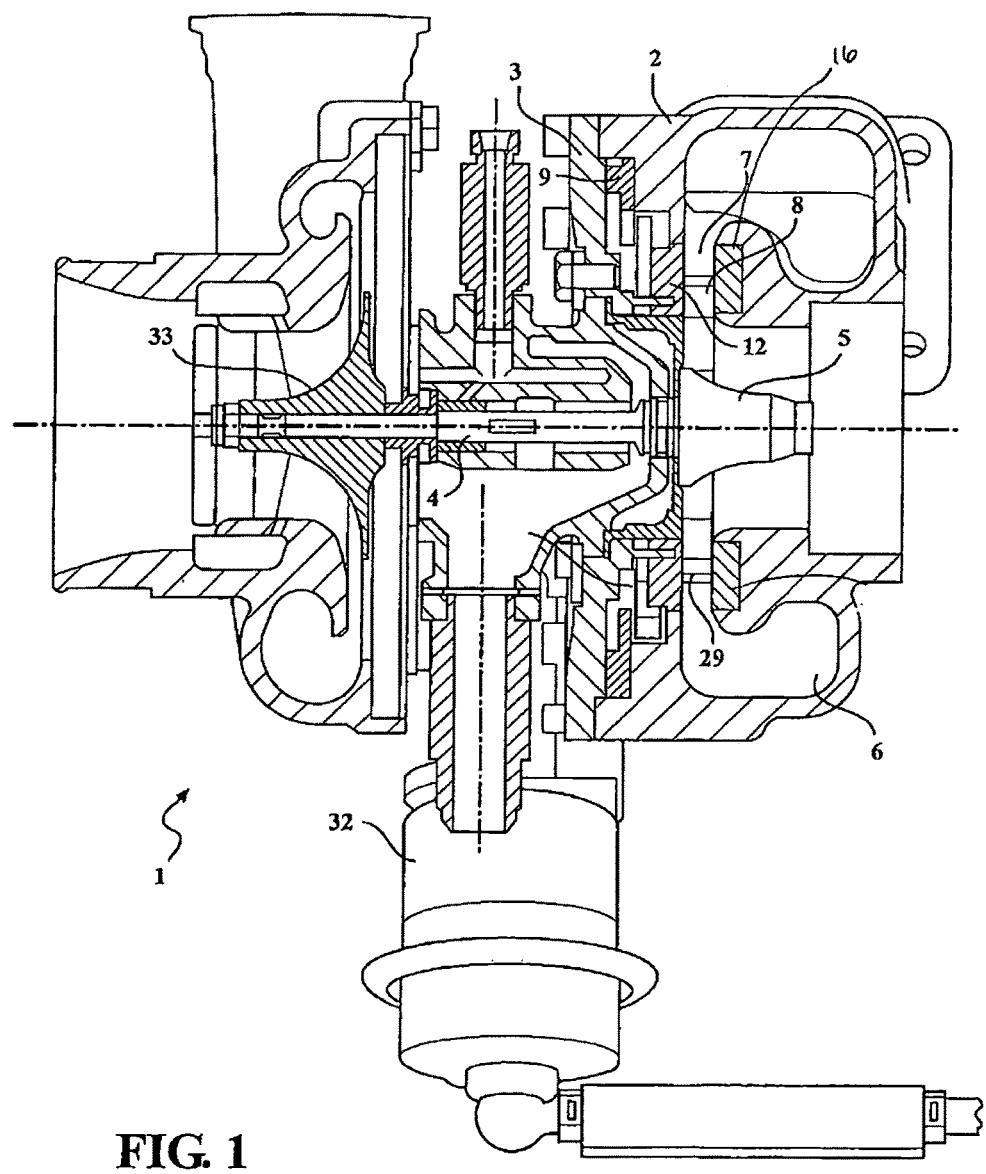
FIG. 1 is a prior art axial cross-sectional view of an exhaust gas VTG turbocharger.
Figure 2:
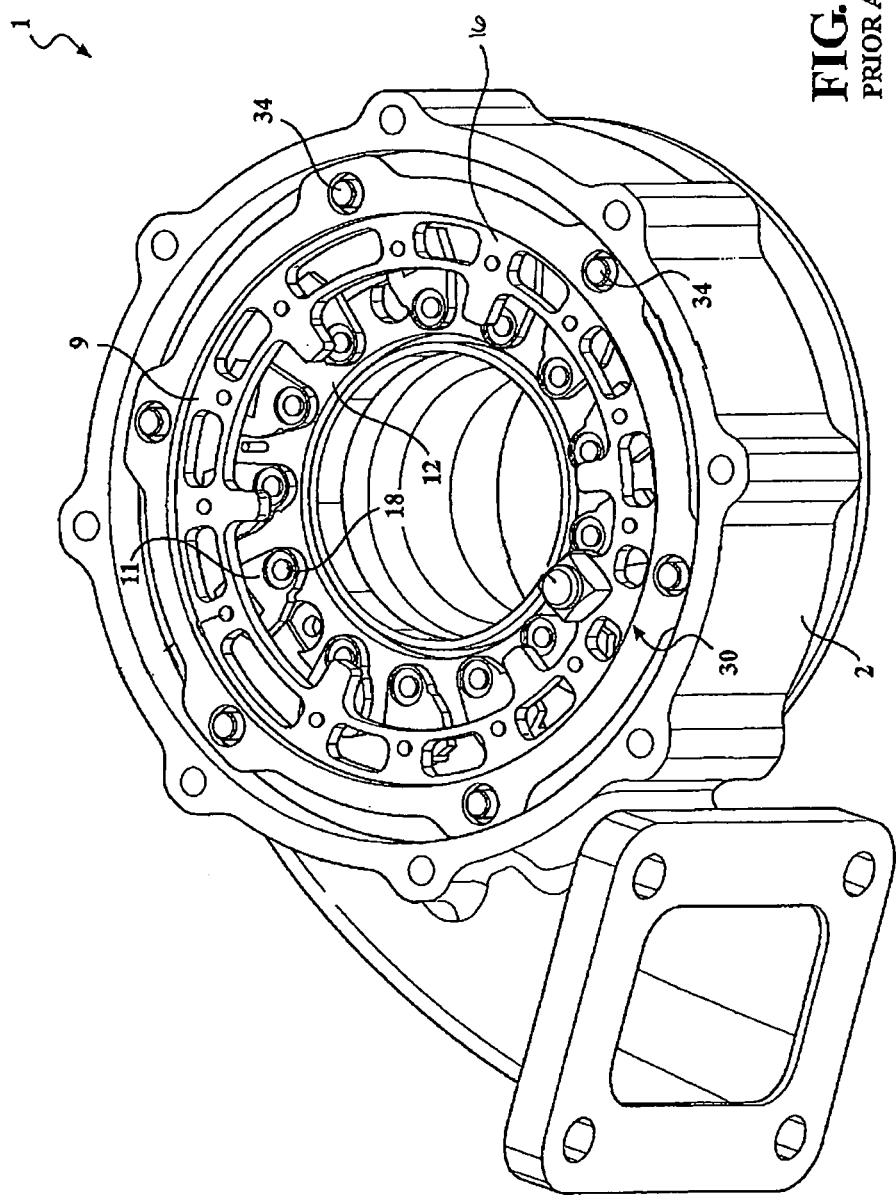
FIG. 2 is a prior art perspective view of a guide apparatus inserted in a turbine housing.
Figure 3:
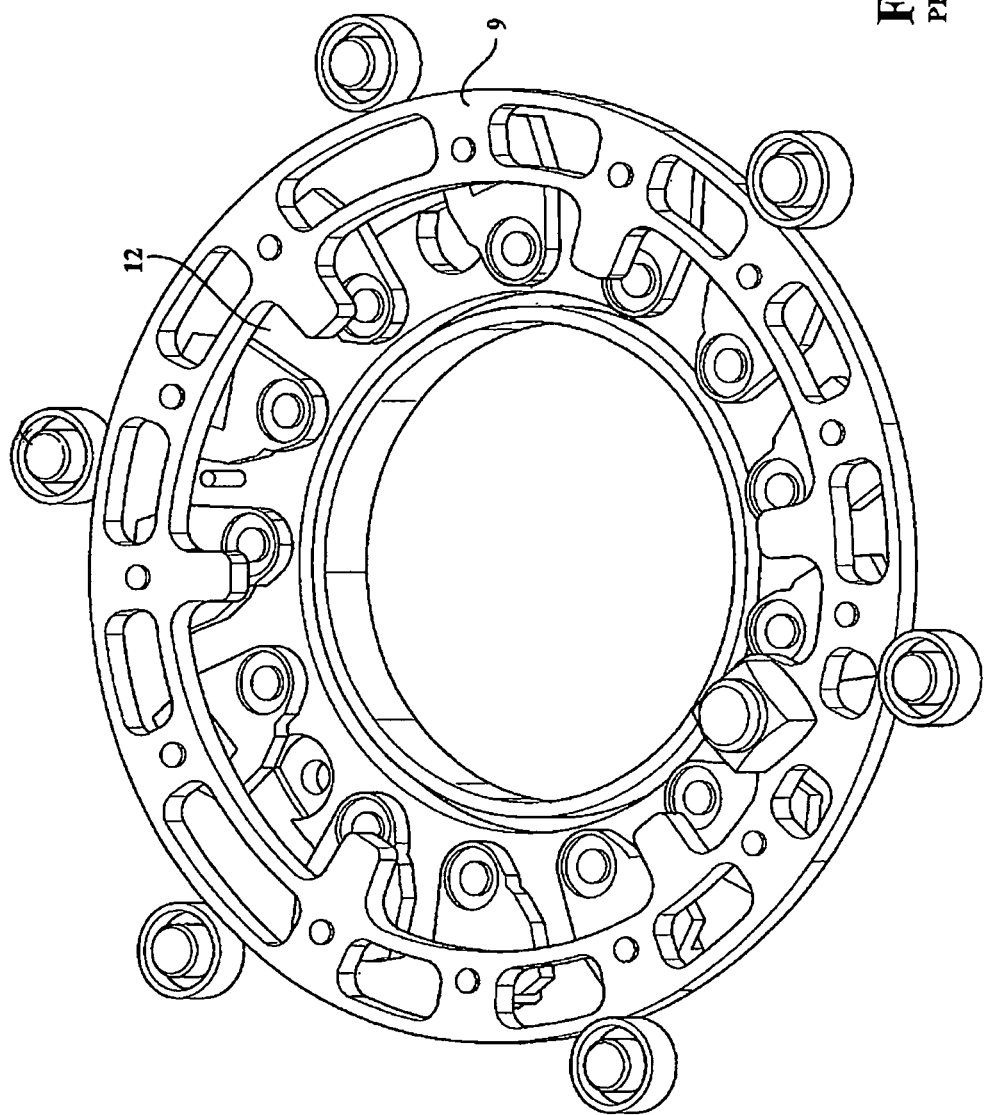
FIG. 3 is a prior art perspective view of the guide apparatus without a cage from the bearing housing side.

A turbocharger 1 with Variable Turbine Geometry (VTG) mechanism 30, or variable-geometry turbocharger, is generally known wherein a compressor wheel/impeller 33 is rotatably driven via a shaft 4 by a turbine wheel 5 in a turbine housing 2, including guide vanes 8 that change their angle of attack in front of the turbine wheel 5. A VTG turbocharger 1 may have a vane ring assembly 17 including a lower vane ring 12 (such as a vane bearing ring), an upper vane ring 16 (which may include a unison ring (9)), a series of guide vanes 8 pivotally mounted at least partially between the lower vane ring 12 and upper vane ring 16, and a plurality of spacers 29 positioned between the lower vane ring 12 and upper vane ring 16.

Figure 4:
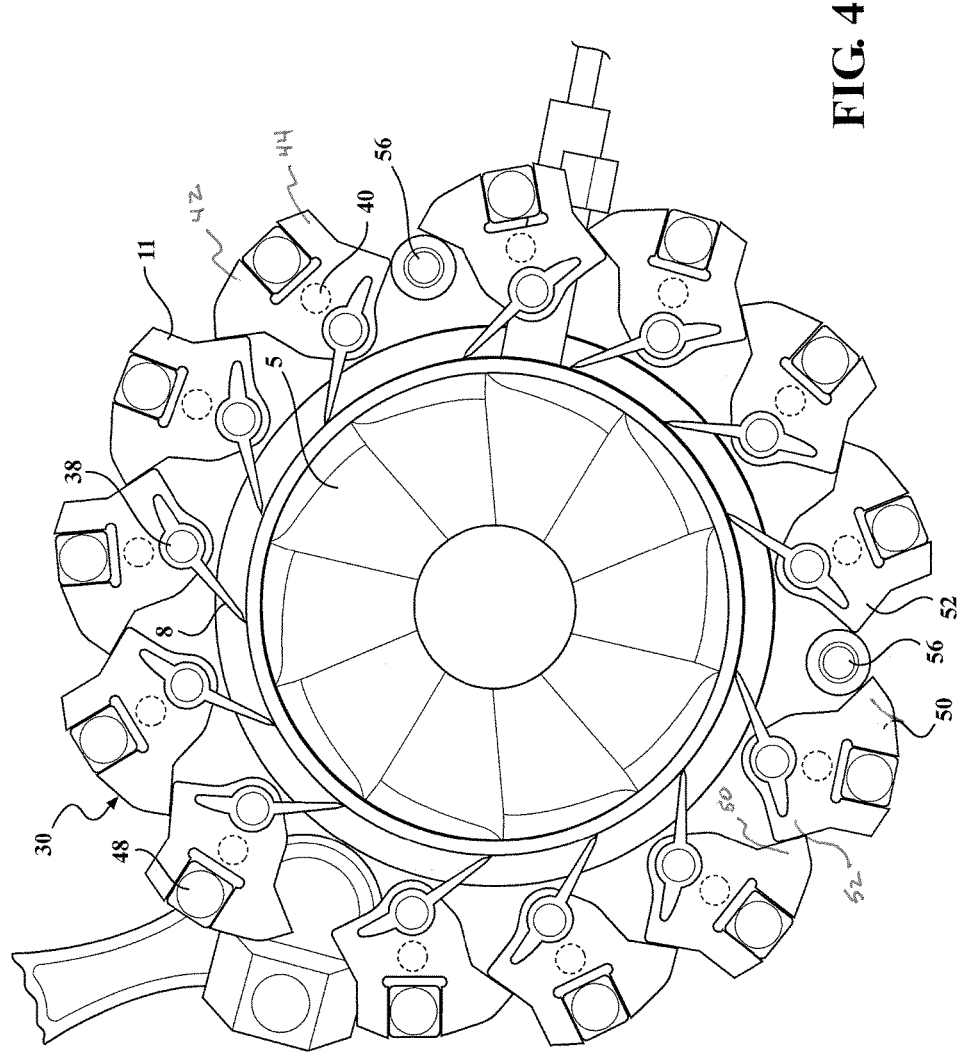
FIG. 4 shows an end view of portions of a VTG turbocharger with vane levers that stop against adjacent vane levers at the full open position.
Figure 5:
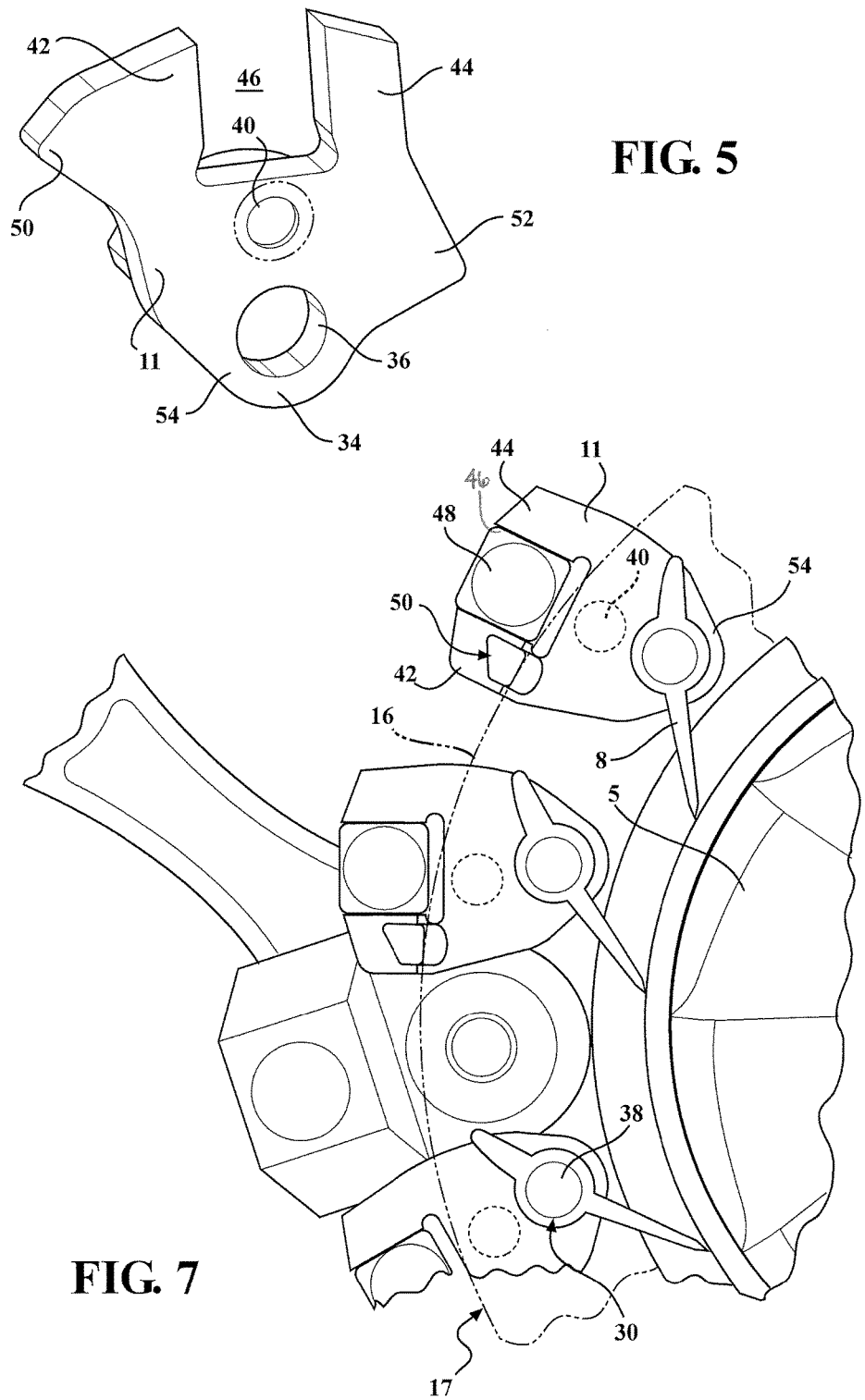
FIG. 5 shows a vane lever with a base extension and a protrusion on a leg member.

FIGS. 4 and 5 show a first embodiment with a vane lever 11 that allows adjacent vane levers 11 to stop against one another in the full open position. The example of the vane lever arrangement allows for ten of the thirteen vane levers 11 to stop against adjacent vane levers 11 wherein every vane lever 11 does not need to contact adjacent vane levers on both adjacent sides. The vane lever 11 has a fastening ring 34 with an aperture 36 in which an end of the vane shaft (stud) 38 is attached. The vane shaft 38 connects to a guide vane 8 that moves to regulate flow of exhaust gas.

The vane lever 11 further has a pivot means 40 (shown as a dashed circle in FIG. 4) upon which the entire vane lever 11 pivots to move the guide vane 8 from closed to open positions. As shown in FIGS. 4 and 5, each vane lever 11 may include two arm members 42 and 44 that extend from an opposite end of the vane lever 11 from the fastening ring 34 and the aperture 36. A connector slot 46 is formed between the arm members 42 and 44 that functionally operate with a control means 48, such as a dowel in a series on a ring moved by the actuator 32. Alternatively, the vanes may pivot around vane shaft 38.

The vane lever 11 may have a protrusion 50 and a base extension 52. The protrusion 50 extends from an arm member 42, and the base extension 52 extends from the base 54 on an opposite side of the pivot means 40 from the protrusion 50. The protrusion 50 and the base extension 52 are preferably coplanar with the base 54. The protrusion 50 on the arm member 42 of one vane lever 11 is designed to contact the base extension 52 of an adjacent vane lever 11 to provide a "stop" at the full open position of the guide vanes 8. This should provide good control of the open position with minimized stackup.

As shown in FIG. 4, the protrusion 50 and the base extension 52 may also have bolts 56 that can limit travel at the fully-open vanes wherein the protrusion 50 on the arm member 42 of one vane lever 11 contacts the bolt 56 and/or the base extension 52 of an adjacent vane lever 11 contacts the bolt 56.

Figure 6:
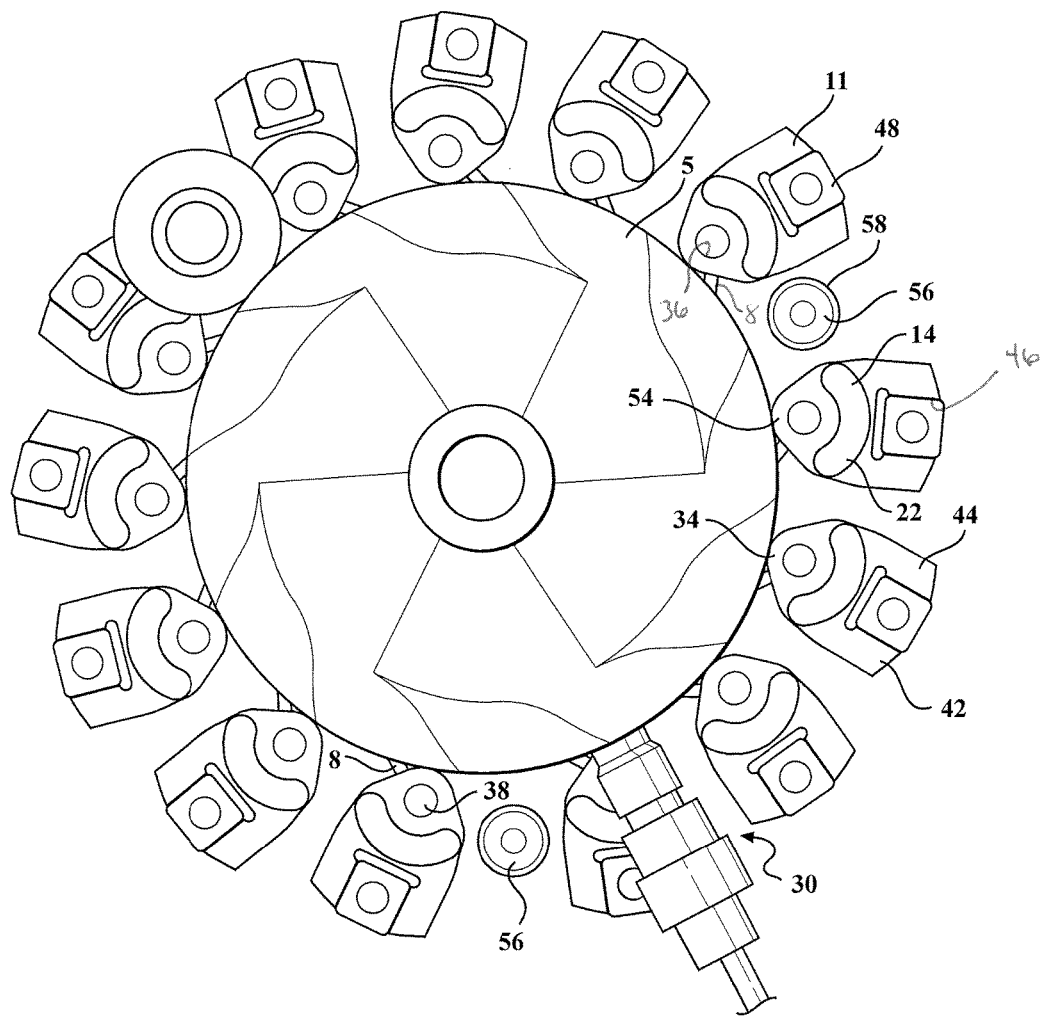
FIG. 6 shows an end view of portions of a VTG turbocharger with vane levers that stop at a vane stop bolt at the full vane open position.

FIG. 6 shows another variation of a vane lever arrangement of vane levers 11 with bolts 56 for the vane levers 11 to stop against in the full vane open position. The bolts 56 are located to limit the travel of adjacent vane levers 11. The vane-stop collars 58 at each bolt location can control adjacent vane levers 11, such as three vane levers 11 interacting with three vane-stop collars 58. In this example, the vane lever arrangement allows for only three vane levers 11 to be stopped. The integrated bolts 56, such as with vane-stop collars 58, would only control three of the vane levers 11 as shown.

As shown, these vane levers 11 also include two arm members 42 and 44 that extend from an opposite end of the vane lever 11 from the base 54 with the aperture 36 for the vane shaft 38 connected to the guide vane 8. The arm members 42 and 44 make the vane lever 11 wider for contacting the bolt 56 while providing a connector slot 46 formed between the arm members 42 and 44 that functionally operate with a control means 48. This embodiment shows axial bosses 14 similar to U.S. Pat. No. 7,886,536 that provide for rolling movement with the inner circumference of the ring 9, but adds the stop function at the vane open position. The vane levers 11 may have various protrusions in differing arrangements.

FIG. 7 shows another embodiment that has a vane lever 11 modified to allow the vane levers 11 to contact the upper vane ring 16 in the full open position. The vane levers 11 can stop on the upper vane ring 16 in the full open position. The vane lever 11 has a fastening ring 34 with an aperture 36 in which an end of the vane shaft 38 is attached to accommodate the adjustable guide vane 8. The vane shaft 38 connects to a guide vane 8 that moves to regulate flow of exhaust gas.

The vane lever 11 further has a pivot means 40 upon which the vane lever 11 pivots to move the guide vane 8 from closed to open positions. As shown in FIG. 7, each vane lever 11 may include two arm members 42 and 44 that extend from an opposite end of the vane lever 11 from the base 54. A connector slot 46 is formed between the arm members 42 and 44 that functionally operates with a control means 48.

The vane lever 11 may have a transverse protrusion 50 on one arm member 42. The transverse protrusion 50 extends substantially perpendicularly upward from an arm member 42. The transverse protrusion 50 is preferably on the same side of the pivot means 40 as the tip of the corresponding guide vane 8. The transverse protrusion 50 on the arm member 42 of each vane lever 11 is designed to contact the upper vane ring 16 to provide a "stop" at the full open position of the guide vanes 8. The vane lever 11 cannot pivot further after the transverse protrusion 50 contacts the upper vane ring 16 as a stop. In FIG. 7, the upper vane ring 16 is shown as clear to orient the otherwise hidden components. This should provide good control of the open position with minimized stackup.

The vane levers 11 are modified with preferred integral and integrated protrusions 50 that function as vane-open stops when contacting other components to control the full open position of the guide vanes 8 of the VTG mechanism 30 to regulate exhaust gas flow to the turbine wheel 5. The integrated protrusions 50 functioning as stops can be incorporated into existing vane lever designs to control the full open position. While certain vane levers 11 would be modified, other components may require only minimal changes.

With the "learn" against the vane-open position as a new strategy different from the vane-closed position, the actuator learn software is modified to ensure consistent learn against the new vane-open stop. The software can control movement of the actuator 32 and thus the vane levers 11 considering the vane-open stop providing maximum exhaust gas flow. With the vane-open strategy, the bias linkage design can also be altered so that open stop can be reached under all conditions. These features with vane levers 11 as vane-open stops should provide good control of the vane-open position.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A method for operating a turbocharger (1) with a variable-turbine geometry mechanism (30) having lower vane ring (12), an upper vane ring (16), and guide vanes (8) pivotally positioned at least partially between the lower vane ring (12) and the upper vane ring (16) for pivoting between a fully open and a fully closed position, and actuator learn software, the method comprising:
adjusting the guide vanes (8) through a range of operation, the range spanning from a minimum vane position to a maximum vane position of the variable geometry turbocharger while receiving in the actuator learn software a signal indicative of vane position;
adjusting a vane actuator to a maximum open setting when said guide vanes (8) are in the maximum open position, and
discontinuing learning of vane position when the actuator learn software has learned the maximum open position of the guide vanes (8),
wherein the guide vanes (8) change their angle of attack via a vane lever (11), and wherein the variable-turbine geometry mechanism (30) includes an integrated vane open stop that controls the full open position of the variable-turbine geometry mechanism (30).

2. The turbocharger (1) of claim 1 wherein the vane lever (11) has an integrated protrusion (50) that functions as the vane-open stop when contacting other components of the variable-turbine geometry mechanism (30) to control the full open position of the guide vanes (8) to regulate exhaust gas flow to the turbine wheel (5).

3. The turbocharger (1) of claim 2 wherein the protrusion (50) extends from an arm member (42) of the vane lever (11) to contact a base extension (52) of an adjacent vane lever (11) in the full open position.

4. The turbocharger (1) of claim 3 wherein each vane lever (11) has said protrusion (50) and its own base extension (52) that are coplanar with the vane lever (11) on opposite sides of the vane lever (11).

5. The turbocharger (1) of claim 2 further comprising a bolt (56) that limits travel at the fully-open guide vanes (8) wherein the protrusion (50) on an arm member (42) of the vane lever (11) contacts the bolt (56).

6. The turbocharger (1) of claim 3 further comprising a bolt (56) that limits travel at the fully-open guide vanes (8) when a base extension (52) of the vane lever (11) contacts the bolt (56).

7. The turbocharger (1) of claim 2 wherein the protrusion (50) transversely extends from the vane lever (11) to contact the upper vane ring (16) at the full open position of the guide vanes (8).

8. A method for operating a variable-geometry turbocharger (1) comprising
a compressor impeller (33) and a turbine wheel (5) connected by a rotating shaft (4) and
a vane ring assembly (17) including a lower vane ring (12), an upper vane ring (16), and guide vanes (8) pivotally positioned at least partially between the lower vane ring (12) and the upper vane ring (16) for pivoting between a fully open and a fully closed position, and
a series of vane levers (11) having respectively an integrated protrusion (50) extending from an arm member (42) of the vane lever (11) that functions as vane-open stops when contacting other components of the turbocharger (1) to control the full open position of the guide vanes (8) to regulate exhaust gas flow to the turbine wheel (5), the method comprising:
adjusting the guide vanes (8) through a range of operation, the range spanning from a minimum vane position to a maximum vane position of the variable geometry turbocharger while receiving in the actuator learn software a signal indicative of vane position;

adjusting a vane actuator to a maximum open setting in response to the vane position sensor when said guide vanes (8) are in the maximum open position, and discontinuing learning of vane position when the actuator learn software has learned the maximum open position of the guide vanes (8).

9. The turbocharger (1) of claim 8 wherein the protrusion (50) contacts an adjacent vane lever (11) in the full open position.

10. The turbocharger (1) of claim 8 further comprising a bolt (56) that limits travel at the fully-open guide vanes (8) when the protrusion (50) contacts the bolt (56).

11. The turbocharger (1) of claim 8 wherein the protrusion (50) transversely extends from the arm member (42) to contact the upper vane ring (16) at the full open position of the guide vanes (8).

\* \* \* \* \*